United States Patent
Bengtsson et al.

(10) Patent No.: US 11,671,167 B2
(45) Date of Patent: Jun. 6, 2023

(54) SYSTEM, PANEL DEVICE AND METHOD FOR PASSIVE REFLECTION OF RF SIGNALS

(71) Applicant: SONY GROUP CORPORATION, Tokyo (JP)

(72) Inventors: Erik Bengtsson, Eslöv (SE); Fredrik Rusek, Eslöv (SE); Olof Zander, Södra Sandby (SE)

(73) Assignee: Sony Group Corporation, Tokyo (JP)

( * ) Notice: Subject to any disclaimer, the term of this patent is extended or adjusted under 35 U.S.C. 154(b) by 56 days.

(21) Appl. No.: 17/608,971

(22) PCT Filed: May 5, 2020

(86) PCT No.: PCT/EP2020/062471
§ 371 (c)(1),
(2) Date: Nov. 4, 2021

(87) PCT Pub. No.: WO2020/254030
PCT Pub. Date: Dec. 24, 2020

(65) Prior Publication Data
US 2022/0216909 A1    Jul. 7, 2022

(30) Foreign Application Priority Data

Jun. 19, 2019    (SE) .................................... 1950760-7

(51) Int. Cl.
*H04B 7/145* (2006.01)
*H01Q 3/44* (2006.01)
*H04B 7/08* (2006.01)

(52) U.S. Cl.
CPC ............... *H04B 7/145* (2013.01); *H01Q 3/44* (2013.01); *H04B 7/084* (2013.01)

(58) Field of Classification Search
CPC .......... H04B 7/084; H04B 7/14; H04B 7/145; H01Q 3/30; H01Q 3/44
See application file for complete search history.

(56) References Cited

U.S. PATENT DOCUMENTS 10,587,313 B2 *  3/2020  Yoon .................... H04B 7/022
2012/0146840 A1   6/2012  Ookawa
(Continued)

FOREIGN PATENT DOCUMENTS

WO    WO-2018156445 A1 *  8/2018  ........... H01Q 15/148

OTHER PUBLICATIONS

International Search Report and Written Opinion from corresponding International Application No. PCT/EP2020/062471, dated Aug. 31, 2020, 16 pages.
(Continued)

Primary Examiner — Blane J Jackson
(74) Attorney, Agent, or Firm — Tucker Ellis LLP (57) ABSTRACT

A system for reflecting an RF signal comprises a plurality of antenna units (2) configured to receive and passively reflect the RF signal, and a reference antenna (6'). Each antenna unit (2) comprises a respective phase shifter (8) operable to adjustably impose a phase change on the RF signal before reflection. The system may be a Large Intelligent Surface (LIS) and the antenna units may be included in an arrangement of separate panel devices. A control system (20) is configured to operate the respective phase shifter (8) to phase align a first analog antenna signal (ASn) with a first analog reference signal (REF), which are received by the respective antenna unit (2) and the reference antenna (6'), respectively, in response to a first RF signal; determine, for the respective phase shifter (8), a first phase setting resulting in phase alignment, and store the first phase setting. The first phase settings enable the system to perform beamforming in (Continued)

reception and/or reflection essentially without power consumption.

20 Claims, 6 Drawing Sheets

(56) References Cited

U.S. PATENT DOCUMENTS

2019/0053321 A1    2/2019  Islam
2020/0028262 A1*   1/2020  Fang ................. H01Q 3/46

OTHER PUBLICATIONS

Search Report from corresponding Swedish Application No. 1950760-7, dated Feb. 4, 2020, 2 pages.
Abdelrahman Taha et al., "Enabling Large Intelligent Surfaces with Compressive Sensing and Deep Learning," Apr. 23, 2019, 33 pages.
Qingqing Wu et al., "Intelligent Reflecting Surface Enhanced Wireless Network: Joint Active and Passive Beamforming Design," 2018 IEEE Global Communications Conference, Dec. 18, 2018, 6 pages.
Chongwen Huang e tla., "Reconfigurable Intelligent Surfaces for Energy Efficiency in Wireless Communication," arXiv:1810.06934v5, Jun. 10, 2019, 13 pages.
Qingqing Wu et al., "Intelligent Reflecting Surface Enhanced Wireless Network via Joint Active and Passive Beamforming," IEEE, copyright 2019, 16 pages.
Search Report from Swedish Patent Application 1950761-5, dated Mar. 12, 2020, 2 pages.
Qingqing Wu et al., "Intelligent Reflecting Surface Enhanced Wireless Network: Joint Active and Passive Beamforming Design," 2018 IEEE Global Communications Conference (GLOBECOM), Dec. 9, 2018, 6 pages.
Qingqing Wu et al., "Beamforming Optimization for Wirelss Network Aided by Intelligent Reflecting Surface with Discrete Phase Shifts," arXiv: 1916.03165v1, Jun. 7, 2019, 30 pages.
Sergi Abadal et al., "Computing and Communications for the Software-Defined Metamaterial Paradigm: A Context Analysis," Digital Object Identifier 10.1109, IEEE ACCESS.2017.2693267, May 17, 2017, 11 pages.
Ertugrul Basar, "Transmission Through Large Intelligent Surfaces: A New Frontier in Wireless Communications," 2019 European Conference on Networks and Communications (EuCNC), Apr. 16, 2019, 6 pages.
Senglee Foo, "Liquid-crystal reconfigurable metasurface reflectors," Huawei Technologies Canada, IEEE, copyright 2017, 2 pages.
Sha Hu et al., "Beyond Massive MIMO: The Potential of Data Transmission With Large Intelligent Surfaces," IEEE Transactions on Signal Processing, vol. 66, No. 10, May 15, 2018, 13 pages.
Sean Victor Hum et al., "Modeling and Design of Electronically Tunable Reflectarrays," IEEE Transactions on Antennas and Propagation, vol. 55, No. 8, Aug. 2007, 11 pages.
Hirokazu Kamoda et al., "60-GHz Electronically Reconfigurable Large Reflectarray Using Single-Bit Phase Shifters," IEEE Transactions on Antennas and Propagation, vol. 59, No. 7, Jul. 2011, 8 pages.
Christos Liaskos et al., "A New Wireless Communication Paradigm through Software-controlled Metasurfaces," IEEE Communications Magazine, Sep. 2018, 9 pages.
Fu Liu et al., "Programmable Metasurfaces: State of the Art and Prospects," arXiv:1803.04252v1, Mar. 12, 2018, 5 pages.
Xin Tan et al., "Increasing Indoor Spectrum Sharing Capacity using Smart Reflect-Array," IEEE ICC 2016—Wireless Communications Symposium, Copyright 2016, 6 pages.

* cited by examiner

| STATIC STATES | ADAPTIVE STATES |
|---|---|
| R12 | R1 |
| RR1 | R2 |
| RR2 | |
| RR1* | |
| RR2* | |
| R12* | |
| RX1 | |
| RX2 | |
| TX1 | |
| TX2 | |
| RX1* | |
| RX2* | |
| TX1* | |
| TX2* | |
| OFF | |

SYSTEM, PANEL DEVICE AND METHOD FOR PASSIVE REFLECTION OF RF SIGNALS

TECHNICAL FIELD

The present disclosure relates generally to wireless communication and, more particularly, to a technique of passively reflecting RF (radio frequency) signals from one device to another device.

BACKGROUND

In wireless communications it is beneficial to have many antennas and to locate the antennas in close vicinity to the users. Ultimately, it would be desirable to install antennas everywhere in the surroundings of users.

Recently, a so-called Large Intelligent Surface (LIS) concept has been proposed. The LIS concept may be seen as an extension of traditional massive multi-input multi-output (MIMO), scaled up beyond the traditional large antenna-array concept. The vision is to provide a low hardware footprint structure that may be arranged on or in building facades, walls and ceilings of rooms and factories, etc. However, massive MIMO requires digital baseband processing of the antenna signals to achieve focusing of energy in three-dimensional space. Since the LIS concept would involve an enormous number of antennas, there is an equal number of antenna signals to be processed, either locally at the antennas or at a central processing unit. Such data processing is difficult to implement with reasonable response time and results in excessive power consumption.

To overcome these drawbacks, the article "Large Intelligent Surfaces for Energy Efficiency in Wireless Communication" by C. Huang et al, disclosed in arXiv:1810.06934, proposes a LIS with a vast amount of small and nearly passive reflecting elements with reconfigurable parameters. Each of the LIS reflecting elements may effectively reflect a phase shifted version of the impinging electromagnetic field, and the LIS is stated to perform as a scatterer with reconfigurable characteristics and does not perform either decoding, channel estimation or transmission.

However, while the foregoing article outlines the concept of a passive LIS and presents a theoretical analysis of how to maximize energy efficiency in outdoor LIS-assisted multi-user down-link communication, there still remains significant inventive activity to make the passive LIS concept practically useful.

The prior art also comprises the article "Intelligent Reflecting Surface Enhanced Wireless Network: Joint Active and Passive beamforming Design" by Q. Wu and R Zhang, published in IEEE Transactions on Wireless Communications, vol. 18, no. 11, pp. 5394-5409, November 2019. Here, a single-antenna UE is linked to a multi-antenna AP both directly and via a LIS, denoted "Intelligent reflecting surface" (IRS). To achieve the links, the active transmit at the AP and the reflect by the phase shifters at the IRS are jointly optimized to maximize the total signal power received at the UE. In a distributed optimization algorithm, the AP and IRS independently adjusts the transmit beamforming and phase shifts in an alternating manner until convergence is reached. This optimization requires repeated signal exchange between all three devices (UE, AP and IRS) and may be difficult to implement in practice.

SUMMARY

It is an objective to at least partly overcome one or more limitations of the prior art.

A further objective is to provide a technique for receiving RF signals at a plurality of antennas and focusing the RF signals in three-dimensional space without baseband processing.

One or more of these objectives, as well as further objectives that may appear from the description below, are at least partly achieved by a system for reflecting an RF signal, a panel device, a method in a system for reflecting an RF signal, and a computer-readable medium according to the independent claims, embodiments thereof being defined by the dependent claims.

Some embodiments relate to a system comprising a plurality of antenna units that are configured to receive an RF signal and passively reflect the RF signal, where each antenna unit comprises a respective phase shifter operable to adjustably impose a phase change on the RF signal before reflection. The system is passive in the sense that the reflection is performed without digital signal processing of the incoming RF signal. The system may be a passive LIS as described in the foregoing, or any other dynamically configurable and passive RF reflection system. To enable the system to achieve beamforming in reception and reflection, respectively, of the RF signal, the system further comprises a reference antenna. In some embodiments, a control system is configured to operate the respective phase shifter to phase align a first analog antenna signal received by the respective antenna unit with a first analog reference signal received by the reference antenna in response to a first RF signal from a first device, determine, for the respective phase shifter, a first phase setting, and store the first phase setting. The first phase settings of the phase shifters enable the system to perform beamforming in reception and/or reflection. The phase alignment is achieved by the phase shifters operating on analog signals, i.e. without baseband processing, and may be performed automatically, fast and efficiently by an analog controller, e.g. in the respective antenna unit.

Still other objectives, as well as features, aspects and technical effects will appear from the following detailed description, the attached claims and the drawings.

BRIEF DESCRIPTION OF DRAWINGS

Embodiments will now be described in more detail with reference to the accompanying schematic drawings.

DETAILED DESCRIPTION OF EXAMPLE EMBODIMENTS

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure. As used herein, the term "and/or" includes any and all combinations of one or more of the associated listed items.

As used herein, an "RF signal" is any electromagnetic signal used for wireless communication and comprising electromagnetic waves with a frequency in the radio spectrum, i.e. in the frequency range from 30 Hz to 300 GHz.

As used herein, "passively reflect" refers to reflection or retransmission of an incoming RF signal without digital signal processing of the RF signal, e.g. for decoding or channel estimation. Preferably, "passively reflect" also implies a reflection without addition of energy to the incoming RF signal before retransmission, e.g. by amplification.

As used herein, "beamforming" is used in its ordinary meaning and refers to a technique of operating an array of antennas to achieve a spatial beam focus for an incoming or outgoing RF signal. The beamforming may thus be made "in reception", which means that analog antenna signals received at the different antennas for an incoming RF signal are combined so as to achieve constructive interference for a particular input direction, and optimally with the spatial beam focus at the origin of the incoming RF signal. The beamforming may also be made "in reflection", which means that analog antenna signals that correspond to an incoming RF signal at the different antennas are conditioned so as to achieve constructive interference for a particular output direction and optimally with the spatial beam focus at the intended recipient of the reflected RF signal.

As used herein, "phase align" refers to adjusting two or more analog signals to be in phase with each other. Further, "coherently combine" refers to combining phase aligned analog signals by addition.

As used herein, an "antenna" refers to an antenna element or a piece of a surface which is configured to receive incoming RF signal waves and convert the RF signal waves to an analog signal, e.g. an oscillating electric current.

Embodiments are related to techniques for receiving RF signals at plurality of antenna units and focusing the RF signals in 3D space without digital signal processing. The antenna units are included in a system which is operable to control the antenna units to passively reflect incoming RF signals. The number of antenna units is large. In a non-limiting example, the number of antenna units is 100,000 or more. The antenna units may be fixedly arranged, e.g. distributed across one or more support structures.

Embodiments are applicable to any standardized or proprietary radio based communication technology, including but not limited to 5G NR, 4G LTE, 3G, Wi-Fi, WiMAX, etc.

Figure 1:
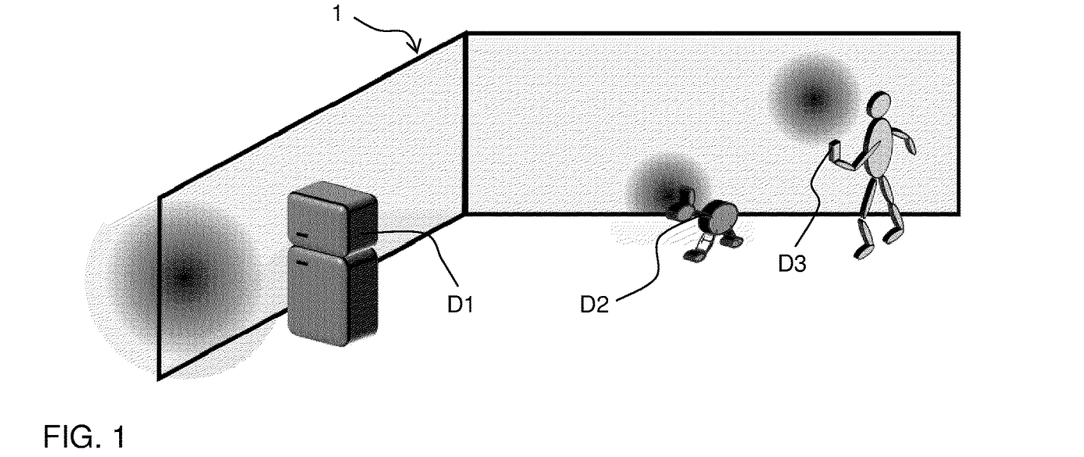
FIG. 1 is a perspective view of user devices interacting with a large intelligent surface (LIS).

FIG. 1 shows an example of a system (LIS) 1 which is deployed to establish communication links for various communication devices D1-D3, e.g. user equipment (UE) as shown, to one or more destination nodes (not shown), e.g. other user equipment or one or more base stations (BS). As understood from FIG. 1, the LIS 1 defines a large surface structure which may be arranged on, e.g., the wall of a building (not shown). The LIS 1 is operated to reflect incoming RF signals from D1-D3 to the respective destination node with beamforming. Due to its large extent, the LIS 1 will define a large aperture and collect most of the radiated energy from D1-D3, as indicated by a respective circular region on the LIS 1, and beamform it in relation to the destination node. This results in a significant array gain and spatial focus that enable large power savings and thus green communications. For example, the radiated power of D1-D3 may be so low that D1-D3 cannot establish any communication link directly with the respective destination node without assistance of the LIS 1.

The embodiments described herein presume that the reflection and beamforming by the LIS 1 is a passive process, i.e. without involving, buffering or baseband processing of incoming RF signals by the LIS 1. One challenge in this context is to achieve beamforming in both reception and reflection without digital signal processing.

Figure 2A:
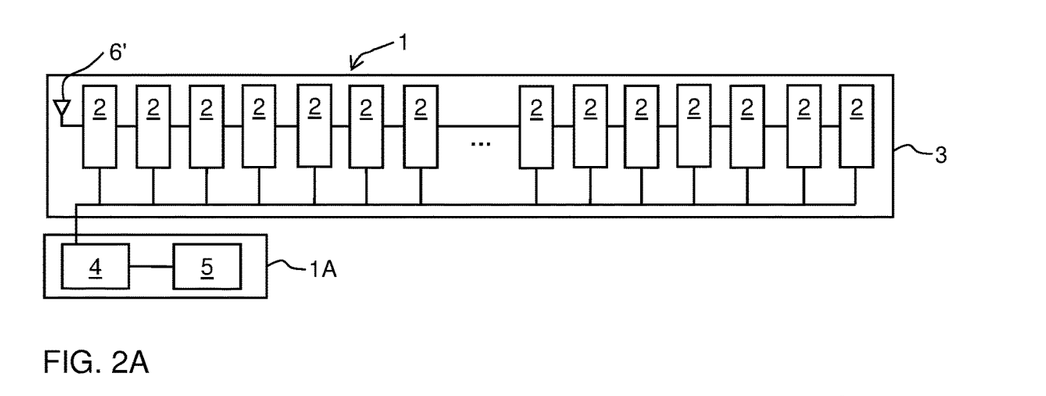
FIG. 2A is a side view, partly in section, of a panel device in accordance with an embodiment.
Figure 2B:
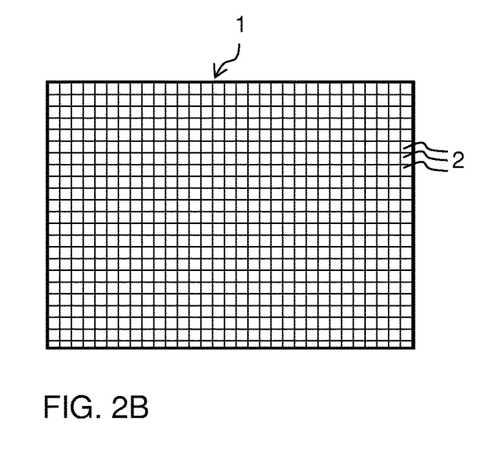
FIG. 2B is a top plan view of the panel device.

FIG. 2A is an elevated side view of a system for reflection of RF signals in accordance with some embodiments. The system comprises a panel device 1 with a panel-shaped housing that comprises a support structure 3. A plurality of antenna units 2 that are fixed to and distributed across the support structure 3, e.g. in two-dimensions as exemplified in the top plan view of FIG. 2B. The panel device 1 includes a reference antenna 6', which is fixed to the support structure 3 and electrically connected to the antenna units 2. The antenna units 2 are individually reconfigurable to collectively and passively receive and reflect an incoming RF signal with beamforming in both reception and reflection. To achieve beamforming in a selected direction, the antenna units 2 are configured to modify a characteristic of an analog signal ("antenna signal") corresponding to the incoming RF signal, based on an analog reference signal from the reference antenna 6'. In the following description, it is assumed that the characteristic is the phase, and that the antenna units 2 are configured to impart a controlled phase-shift (or equivalently, time delay) to the antenna signal.

The overall operation of the panel device 1 is controlled by a control device 1A, which include any type of processing device 4 such as a microprocessor, microcontroller, DSP, CPU, etc. The processing device 4 is connected to the antenna units 2 and a memory device 5 in the control unit 1A. The memory device 5 may comprise one or more of a buffer, a flash memory, a hard drive, a removable media, a volatile memory, a non-volatile memory, a random access memory (RAM), or another suitable device. The processing device 4 may execute instructions stored in the memory device 5 to control the operation of the panel device 1. The instructions when executed by the processing device 4 may cause the panel device 1 to perform any of the methods described herein, or part thereof. The software instructions, which may be supplied to the control device 1A on a computer-readable medium, e.g. a tangible (non-transitory) product such as a magnetic medium, optical disk, read-only memory, flash memory, etc., or a propagating signal.

It is worth noting that the system in FIG. 2A is completely different from existing MIMO, beamforming, decode-and-forward relaying and backscatter communication paradigms, which involve RF processing, decoding, encoding and retransmission. Instead, the panel device 1 comprises a large number of passive elements, which reflect an incident RF signal with a selected phase to achieve beamforming in a selected direction, and preferably both in relation to an originating communication device and a destination node.

Figure 2C:
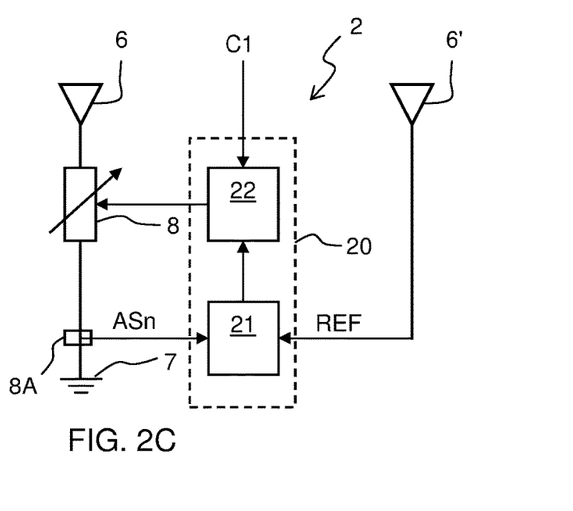
FIG. 2C is a circuit diagram of an antenna unit in the panel device.

An example of an antenna unit 2 is schematically depicted in FIG. 2C. The antenna unit 2 comprises an antenna 6, which is connected on an electrically conducting path to an RF reflection element 7, which is reflective to the analog antenna signal ASn that is generated by the antenna 6 in response to an incoming RF signal. In the illustrated example, the RF reflection element 7 is a ground plane. In another example, the RF reflection element 7 is defined by another type of discontinuity in the characteristic impedance of the conducting path, e.g. an open end. A tunable phase shifter 8 is disposed in the conducting path in series with the antenna 6. The phase shifter 8 is operable to modify the phase of the antenna signal, e.g. by modifying its capacitance and/or inductance or by otherwise time-delaying the antenna signal. In one non-limiting example, the phase shifter 8 is a varactor diode or an inductor. The antenna unit 2 further comprises a local control device 20, which includes a phase comparator 21 and a phase controller 22. The phase comparator 21 is arranged to receive the antenna signal, from a coupler or switch 8A in the conducting path, to receive the reference signal REF from the reference antenna 6', and to output a measurement signal indicative of the phase difference between these signals. The coupler/switch 8A is a passive element arranged between the phase shifter 8 and the RF reflection element 7. The coupler/switch 8A may be a directional element that is configured to only divert, to the phase comparator 21, power flowing in one direction in the conductive path, either towards or away from the RF reflecting element 7. The phase controller 22 is operable in either an adaptive state or a static state. In the adaptive state, the phase controller 22 adjusts the phase shifter 8 to achieve a predefined criterion that corresponds to substantially a phase alignment of the antenna signal and the reference signal. The predefined criterion may be that one or more signal values in, or computed from, the measurement signal from the phase comparator 21 is equal to, above or below a target value, or is within a range of target values. In the adaptive state, the local control device 20 operates a control loop defined by analogue circuitry to automatically determine a setting of the phase shifter 8 that results in the phase alignment. In the static state, the phase controller 22 applies a predetermined setting to the phase shifter 8. The phase controller 22 may retrieve the predetermined setting from a local memory (not shown) in the antenna unit 2, or the predetermined setting may be retrieved from the memory 5 by the processor 4 and provided to the phase controller 22. The phase controller 22 may switch between the adaptive and static states based on a control signal C1 from the processor 4. In the context of the present disclosure, the control device 1A and the local control device 20 in the antenna units 2 are considered to collectively define a "control system" of the panel device 1.

The reference antenna 6' may be a dedicated antenna in the system 1. Alternatively, an antenna of one of the antenna units 2 in the system 1 may be deployed as a reference antenna, provided that the phase shifter is set to a fixed phase value (e.g. zero) in the adaptive states R1, R2 (below).

Figure 3A:
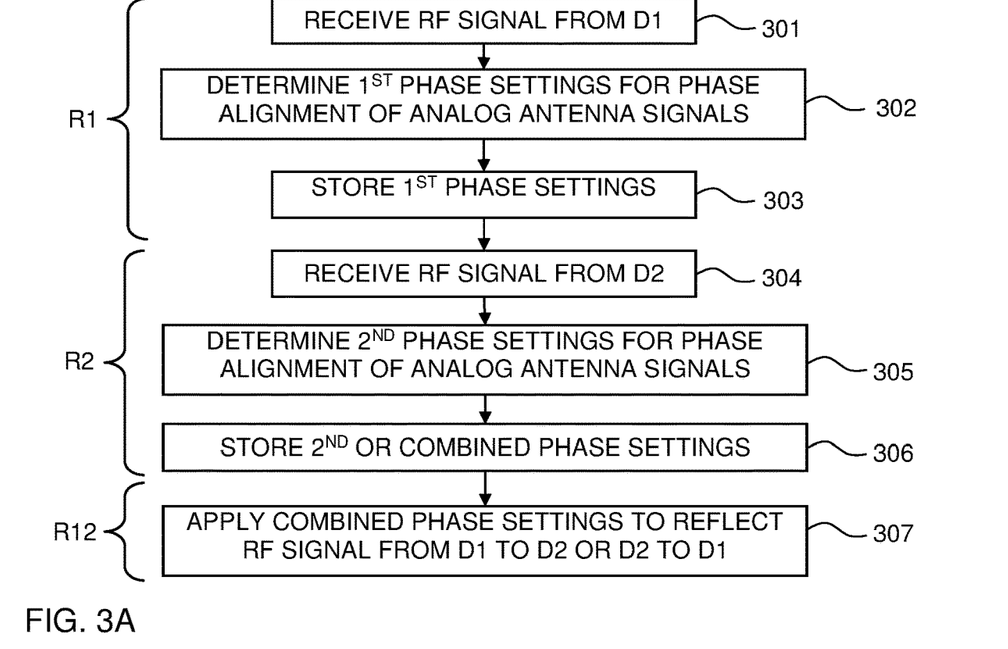
FIG. 3A is a flow chart of an example method of training and operating a panel device for passive reflection, and FIG. 3B are examples of operating states of a panel device.

FIG. 3 illustrates an exemplifying method that may be performed by the control system of a panel device. During execution of the method, the control system sets the panel device in different modes or states: a first adaptive state R1, a second adaptive state R2, and a static reflection state R12. The method will be exemplified with reference to FIGS. 4A-4C, which illustrate first and second communication devices D1, D2 that transmit RF signals received by a panel device 1. Although D1 is illustrated as a base station and D2 as a mobile phone, the respective RF signal may originate from any type of communication device, stationary or moveable, including but not limited to a mobile phone, a PDA, a laptop, a base station, a wearable computer, a wireless sensor, etc.

Figure 4A:
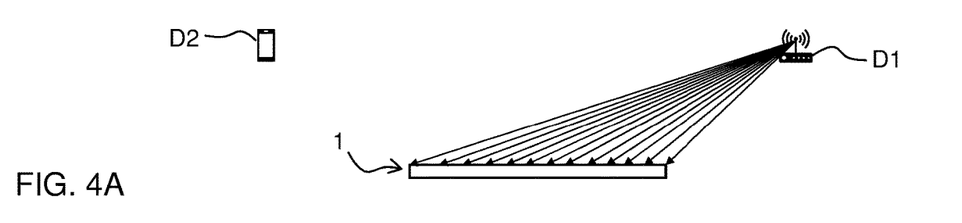
FIGS. 4A-4C illustrate training and operation of a panel device in relation to two wireless devices.

In the first adaptive state R1, the panel device 1 receives a first RF signal from D1 (step 301), as shown in FIG. 4A. The first RF signal is received by the antennas 6 and results in a respective first analog antenna signal. The first RF signal is also received by the reference antenna 6' and results in a first analog reference signal. In step 302, the respective phase shifter 8 is operated to phase align the first analog antenna signal with the first analog reference signal, e.g. as described above with reference to FIG. 2C, and a first phase setting of the respective phase shifter 8 is determined. Thus, the first phase setting is the setting (phase) of the respective phase shifter 8 to achieve the phase alignment between the first analog antenna signal and the first analog reference signal, and thus to achieve phase alignment of the first analog antenna signals of the antenna units 2. It may be noted that the phase alignment of the first antenna signals causes the panel device 1 to retro-reflect the first RF signal with beamforming to D1. In step 303, the first phase settings are stored, e.g. in local memory of the respective antenna unit or in the memory unit 5.

Figure 4B:
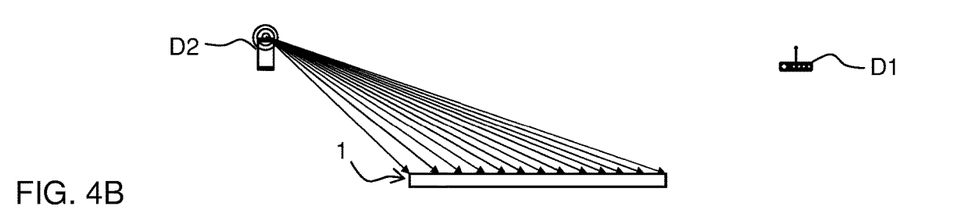

In the second adaptive state R2, the panel device 1 receives a second RF signal from D2 (step 304), as shown in FIG. 4B. The second RF signal is received by the antennas 6 and results in a respective second analog antenna signal. The second RF signal is also received by the reference antenna 6' and results in a second analog reference signal. In step 305, the respective phase shifter 8 is operated to phase align the second analog antenna signal with the second analog reference signal, e.g. as described above with reference to FIG. 2C, and a second phase setting of the respective phase shifter 8 is determined. Thus, the second phase setting is the setting (phase) of the respective phase shifter 8 to achieve the phase alignment between the second analog antenna signal and the second analog reference signal, and thus to achieve phase alignment of the second analog antenna signals of the antenna units 2. The phase alignment of the second antenna signals causes the panel device 1 to retro-reflect the second RF signal with beamforming to D2. In step 306, the second phase settings and/or combined phase settings given by a combination of the first and second phase settings are stored, e.g. in local memory of the respective antenna unit or in the memory unit 5. Alternatively, the second or combined phase settings may be stored by being applied to the phase shifters 8, which thereby are locked.

Figure 4C:
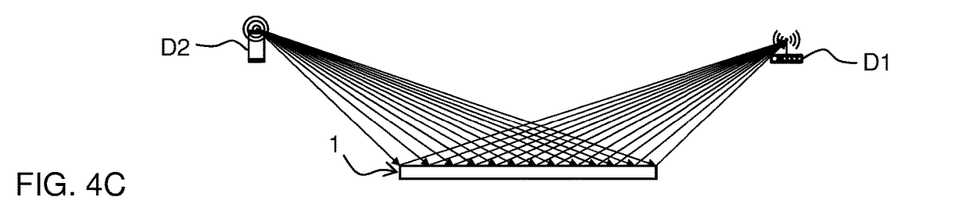

In the static reflection state R12, the combined phase settings are applied to the phase shifters 8 (step 307). Depending on implementation, step 307 may retrieve the first and second phase settings from memory and compute the combined phase settings, or step 307 may retrieve the combined phase settings from memory. Alternatively, step 307 may be performed by locking of the phase shifters in step 306. By applying the combined phase settings to the phase shifters, the panel device 1 is operable to receive an RF signal from D1 with beamforming in relation to D1 and retransmit (reflect) the RF signal with beamforming in relation to D2. Similarly, the panel device 1 is operable to receive an RF signal from D2 with beamforming in relation to D2 and retransmit (reflect) the RF signal with beamforming in relation to D1. Thereby, a communication link may be established between D1 and D2 via the panel device 1, as shown in FIG. 4C.

In one non-limiting example, step 302 may result in phase setting θ1 of a phase shifter 8 to achieve the phase alignment in state R1, and step 305 may result in phase setting θ2 of the phase shifter 8 to achieve the phase alignment in state R2. The combined phase setting of the phase shifter 8 to be used in R12 may be computed as the average of θ1 and θ2, i.e. (θ1+θ2)/2. Corresponding computations may be made for each antenna unit in the panel device 1.

Figure 3B:
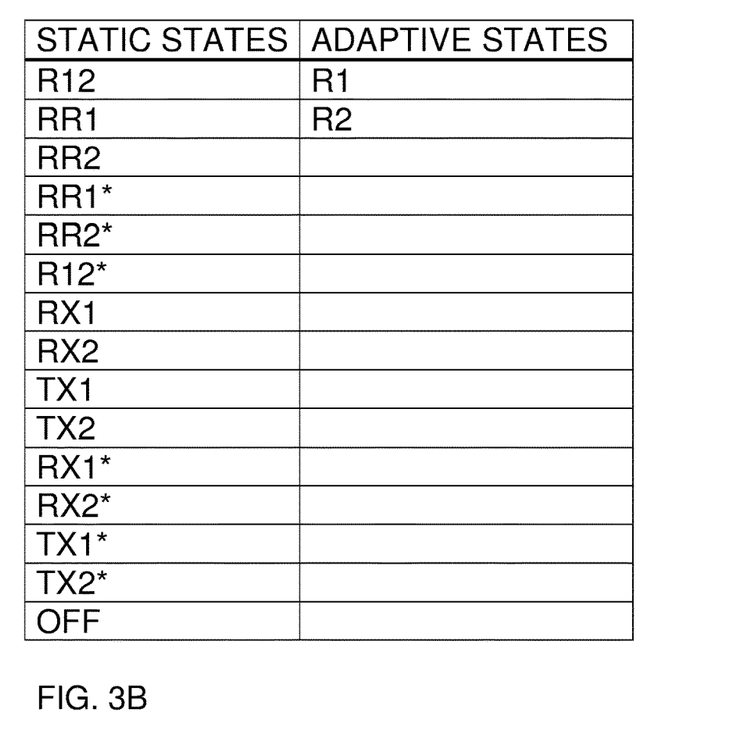

FIG. 3B lists some conceivable static and adaptive states of the panel device 1, including the aforesaid states R1, R2 and R12. In addition to these states, the panel device 1 may attain a static first retroflection state RR1, in which the phase shifters 8 are set to retroreflect an incoming RF signal from D1. In RR1, the phase settings θ1 are applied to the phase shifters 8. Correspondingly, the panel device 1 may be controlled to retroreflect an incoming RF signal from D2 by applying the phase settings θ2 to the phase shifters 8 in a static second retroflection state RR2. The remaining static states that are listed in FIG. 3B will be discussed in detail further below.

Figure 5A:
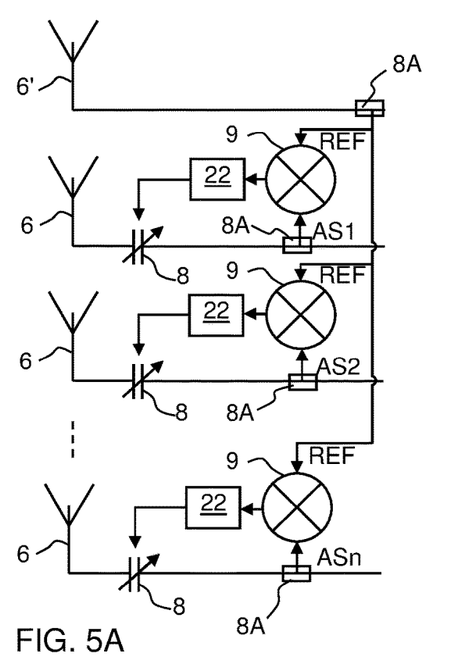
FIGS. 5A-5B are schematic circuit diagrams of example structures for phase adjustment of antenna units.

FIG. 5A is a first schematic implementation example of electronic circuitry that automatically phase aligns analog signals of different antennas. The upper antenna is used as the reference antenna 6'. An analog multiplier (mixer) 9 is arranged in each antenna unit to multiply the analog reference signal REF of reference antenna 6' with the analog antenna signal AS1, . . . , ASn of the antenna 6 in the respective antenna unit. A phase controller 22 is arranged to receive the analog output signal of the multiplier 9 and adjust a phase shifter 8 to optimize (e.g. maximize or minimize) a magnitude (e.g. power) of the analog output signal, or an analog signal derived therefrom. With reference to FIG. 2C, the analog multiplier 9 corresponds or is included in the phase comparator 21. It may be noted that AS1, . . . , ASn in FIG. 5A may represent the above-mentioned first analog antenna signals or second analog antenna signals.

Figure 5B:
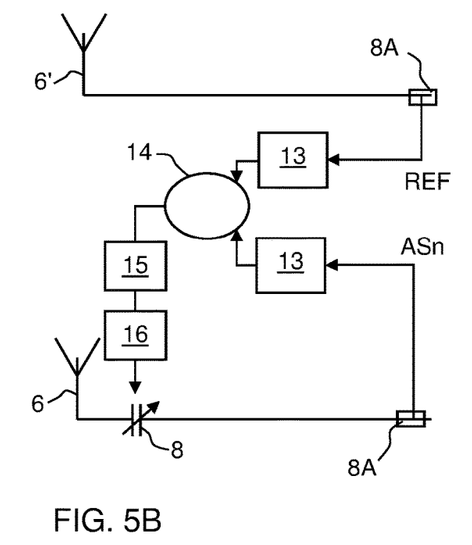

FIG. 5B is a second schematic implementation example of the electronic circuitry of an antenna unit. Identical bandpass filters 13 (BPF) are arranged to transmit the analog reference signal REF and the respective analog antenna signal (ASn in FIG. 5B) within a defined frequency band. A combiner 14 is arranged to receive input signals from the bandpass filters 13. In a first example, the combiner 14 is an analog multiplier or mixer, and a low-pass filter 15 is arranged to extract the DC component of the output signal of the mixer 14. The DC component is representative of the phase difference between the input signals to the mixer 14. The illustrated circuit then operates to optimize (e.g. maximize or minimize) the DC component, and a sample-and-hold device 16 is arranged to hold the optimized DC component. In a second example, the combiner 14 is an analog adder and one of the input signals to the adder is inverted (phase shifted by 180 degrees) so that the adder outputs an analog difference signal representative of the difference between the input signals. A power detector 15 is arranged to measure the power of the difference signal. The power is representative of the phase difference between the input signals to the adder 14. The illustrated circuit then operates to minimize the power, and a sample-and-hold device 16 is arranged to hold the minimized power value. One advantage of the second example over the first example is that the second example uses the full bandwidth of the input signals to the combiner 14. In the first example, a mixed-down DC component is isolated, which results in a loss of power components that are not mixed down to DC.

It might be advantageous to include more than one panel device in a system for reflection of RF signals. This would enable the panel devices to be manufactured at manageable sizes and be combined to span a larger surface area, e.g. to cover a wall or ceiling, or a portion thereof. Desirable structural features of the respective panel device may include that it is easily attachable to neighboring panel device(s), that it provides electronic and/or optical connections for communication of control data with neighboring panel device(s), and that it may be supplied by power from neighboring panel devices(s).

Figure 6A:
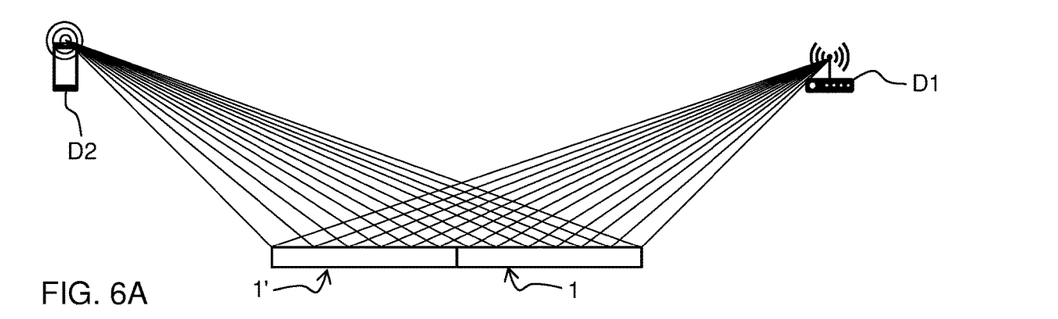
FIG. 6A is a side view a pair of panel devices in coherent operation for passive reflection.
Figure 6B:
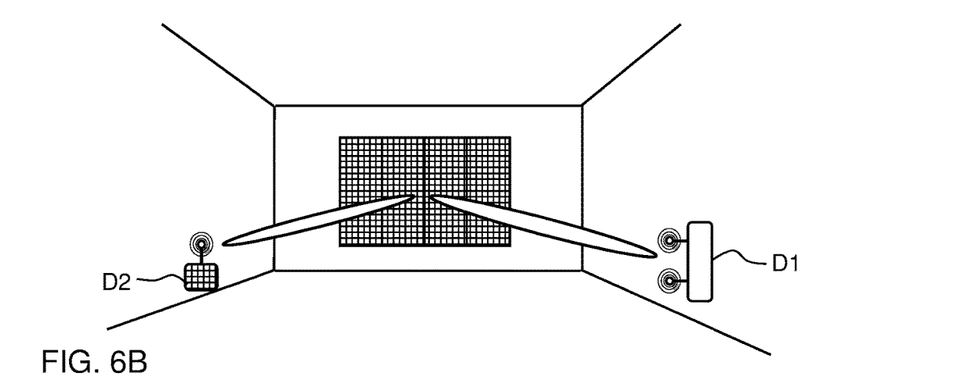
FIG. 6B is a perspective view of a plurality of panel devices in coherent operation.

FIG. 6A illustrate, in side view, a system of panel devices comprising a primary or master panel device 1 and a secondary or slave panel device 1'. In the illustrated example, the panel devices 1, 1' are operated coherently to reflect RF signals between D1 and D2. The coherent operation implies that an RF signal that is reflected by different panel devices 1, 1' is received coherently at D1 and D2, respectively. FIG. 6B is a perspective view of a system of eight panel devices arranged side-by-side on a wall and operated coherently to reflect RF signals, with beamforming, between D1 and D2. The beamforming is schematically represented by a respective lobe in FIG. 6B, as well as in FIGS. 6D, 6E and 7B. The skilled person understands the lobe is a simplification and that the beamforming may have any shape and may involve reflected signal components.

Figure 6C:
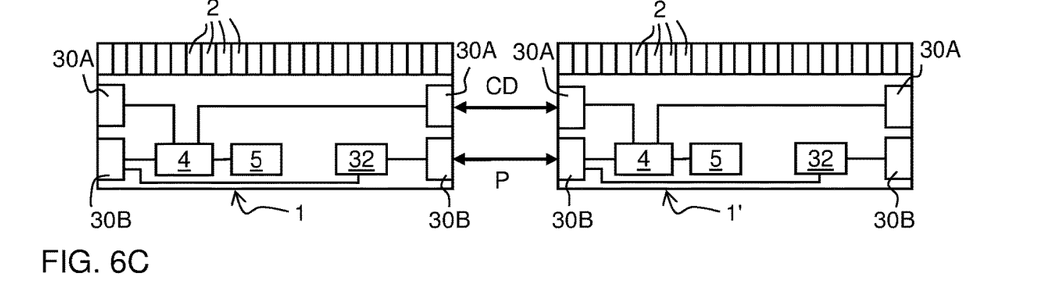
FIG. 6C is a side view, partly in section, of two panel devices in accordance with an embodiment.
Figure 6D:
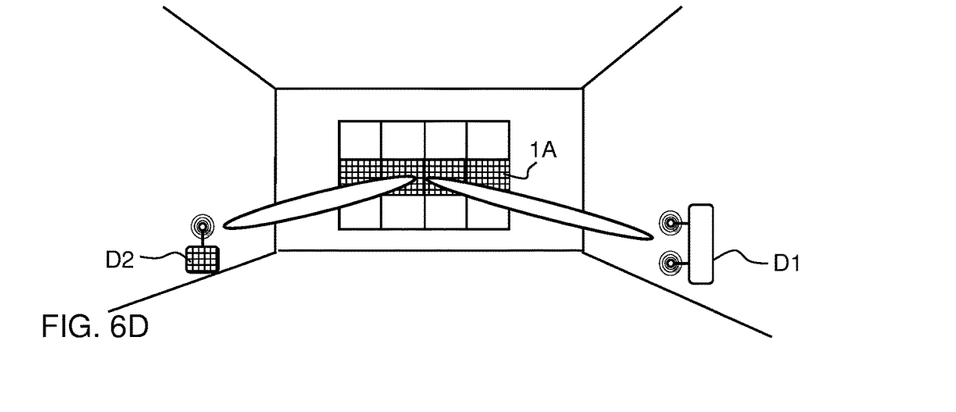
FIGS. 6D-6E show examples of coherent operation of selected panels for passive reflection.
Figure 6E:
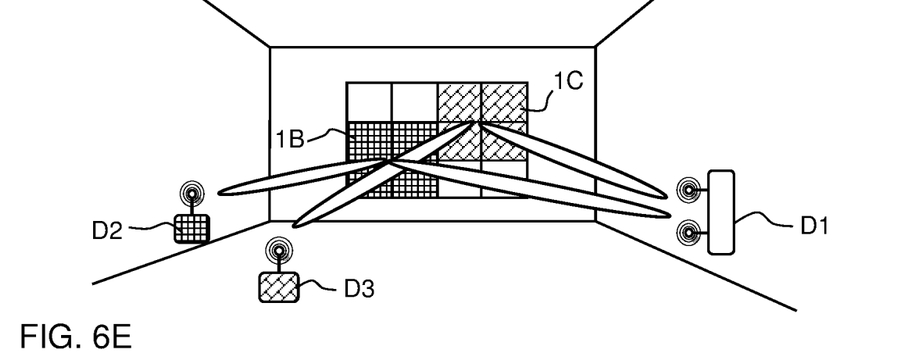

FIG. 6C is a side view of two neighboring panel devices 1, 1' and illustrates internal components. The panel devices 1, 1' are structurally identical and comprise the plurality of antenna units 2, the processor 4 and the memory 5 as described with reference to FIG. 2A. The respective panel device 1, 1' further comprises at least two signal interfaces 30A (electrical and/or optical) and at least two power interfaces 30B (electrical). The interfaces 30A, 30B may be located on at least two sides of the respective panel. In the respective control panel, the signal interfaces 30A are connected to the processor 4 and configured to enable control data CD to be communicated between processors 4 in the panel devices 1, 1'. The control data CD may be analog or digital. In the respective control panel, the power interfaces 30B are connected to a power management unit, PMU, 32 and are configured for connection to a power supply, e.g. main power, as well as to a power interface 30B on another panel device for transfer of electrical power. In one embodiment, the PMU 32 is switchable between a power supply mode and a power transfer mode.

Reverting to FIG. 6B, an installer has mounted the panel devices on the wall in a contiguous fashion. Each panel device has been connected to adjacent panel devices through the interfaces 30A, 30B, which in this example are located on all four sides of the panel devices. A selected panel device is connected to a power supply (not shown), and all other panel devices are supplied with power by power transfer from the selected panel device through all other panel devices. The PMU 32 of the selected panel devices is set in the power supply mode and the PMUs 32 of the other panel devices are set in power transfer mode.

To achieve coherent operation of panel devices 1, 1' in a system, e.g. reflection between D1 and D2 as shown in FIGS. 6A-6B, each of the panel devices 1, 1' may perform the method in FIG. 3 to determine the combined phase settings of its antenna units. Each panel device 1, 1' may determine the combined phase settings in relation to its reference antenna 6'. Generally, the relative location of the panel devices 1, 1' and thus of the reference antennas 6' is not known with sufficient precision. To ensure coherent operation of all panel devices 1, 1', phase correction data may be applied by the respective slave panel device 1' to adjust its combined phase settings by the phase correction data. The phase correction data may be determined in an initial calibration procedure, which may involve measuring the time delays between receipt of an RF signal by the reference antennas 6' in the system. The phase correction data may be stored in the respective slave panel device 1 or be transferred as control data CD from the master panel device 1 to the respective slave panel device 1'. Reverting to the states in FIG. 3B, the master panel device 1 may be set in static state R12, and the respective slave panel device 1' may be set in static slave state R12*, in which it applies its combined phase settings adjusted by the phase correction data to the phase shifters 8 in the antenna units 2 (FIG. 2C).

To achieve coherent operation of the panel devices 1, 1' for retroreflection to D1 (or D2), the master panel device 1 may be set in static state RR1 (or RR2), and the respective slave panel device 1' may be set in static slave state RR1* (or RR2*), in which it applies its first (or second) phase settings adjusted by the phase correction data to the phase shifters 8 in the antenna units 2.

In one example, the phase correction data is a phase value φ, which is specific to the respective slave panel device 1'. A phase setting θ1 determined for state RR1 may be adjusted to θ1+φ in state RR1*, a phase setting θ2 determined for state RR2 may be adjusted to θ2+φ in state RR1*, and a combined phase setting (θ1+θ2)/2 determined for state R12 may be adjusted to (θ1+θ2)/2+φ in state R12*.

In another embodiment, the analog reference signal from the reference antenna 6' in the master panel device 1 is transferred as control data CD to the respective slave panel 1', which may perform the method in FIG. 3 to determine its phase settings in relation to this analog reference signal. The respective slave panel 1' may then apply resulting phase settings in one or more of the static slave states R12*, RR1* and RR2*.

In some embodiments, the master panel device 1 may control the respective slave panel device 1' to enter a specific state, by providing corresponding control data CD to the respective slave panel device 1'. For example, the specific state may be any of the static and adaptive states listed in FIG. 3B.

In some embodiments, the master panel device 1 may be dynamically selected among the panel devices in the system, or among a group of panel devices (below). For example, each of the panel devices may compute a current value of a selection parameter and distribute the current value among the other panel devices, e.g. as control data CD, whereupon one of the panel devices may select itself as master panel device 1 based on the current values of all panel devices. The other panel devices may automatically set themselves as slave panel devices 1'.

In some embodiments, a subset of the panel devices in the system are coherently operated. An example is shown in the perspective view of FIG. 6D, in which a group 1A of four panel devices are coherently operated to reflect RF signals between D1 and D2.

In some embodiments, a group of panel devices to be coherently operated is selected based on a signal quality parameter of incoming RF signal(s) from D1 and/or D2 at the respective panel device in the system. For example, each of the panel devices in the system may determine a current value of a signal quality parameter and compare the current value to a quality threshold. If the current value exceeds the quality threshold, the panel device may signal, by the control data CD, to the other panel devices that it will be included in the group. Thus, the panel devices may automatically assign themselves to reflect an incoming RF signal. The signal quality parameter may be computed for one or more aggregated antenna signals generated by summation of the phase aligned antenna signals in all antenna units of the respective panel device. The respective aggregated analog signal is an analog representation of the RF signal from D1 or D2. For example, the signal quality parameter may represent magnitude, entropy, power, SNR, array gain, etc. These embodiments will enable remaining panel devices outside the group to be deactivated or to be operated to reflect RF signals between another pair of communication devices (cf. FIG. 6E).

In some embodiments, the panel devices in the system, or within a group, may dynamically assign identifiers (IDs) that are unique to each panel device within the system or group. Thereby, the control data CD may include the ID of one or more destination control panels, and optionally the ID of the originating control panel. The panel devices may be configured to route the control data CD within the system to the destination panel device(s) based on the included IDs.

In some embodiments, different panel devices or subgroups of panel devices in the system may be operated to reflect RF signals in relation to different pairs of communication devices. An example is shown in the perspective view of FIG. 6E, in which four panel devices in a respective subset 1B, 1C are coherently operated to reflect RF signals between D1 and D2, and between D1 and D3, respectively. The panel devices may assign themselves to a group based on current values of the above-mentioned signal quality parameters for incoming RF signals from different communication devices. For example, the panel devices in subset 1B may have a larger current value for RF signals from D1 and D2 than for RF signals from D1 and D3, whereas the opposite is true for the panel devices in subset 1C.

In some embodiments, an RF signal may be received with beamforming by a first panel device or group of panel devices and retransmitted with beamforming by a second panel device or group of panel devices. Thereby, the system is operated as if the first and second panel devices or groups were a single panel device.

Figure 7A:
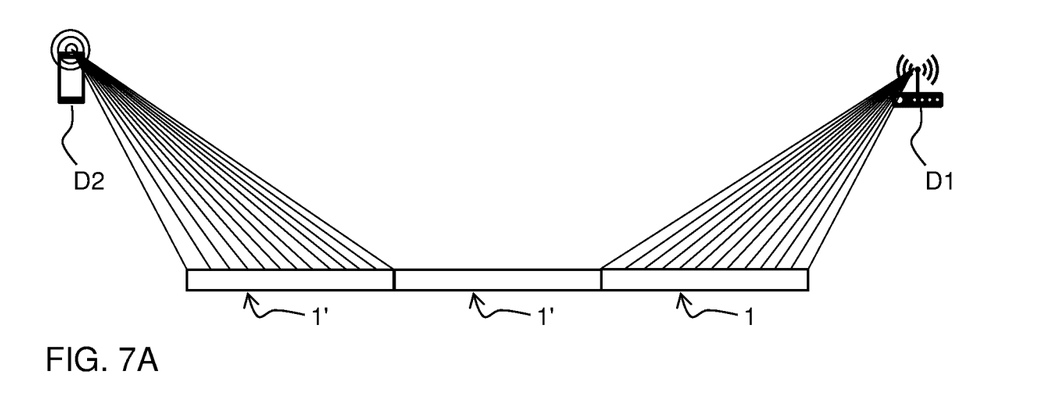
FIGS. 7A-7B illustrate panel devices in coherent operation for passive reflection by coherent signal reception at one panel device and coherent signal transmission at another panel device
Figure 7B:
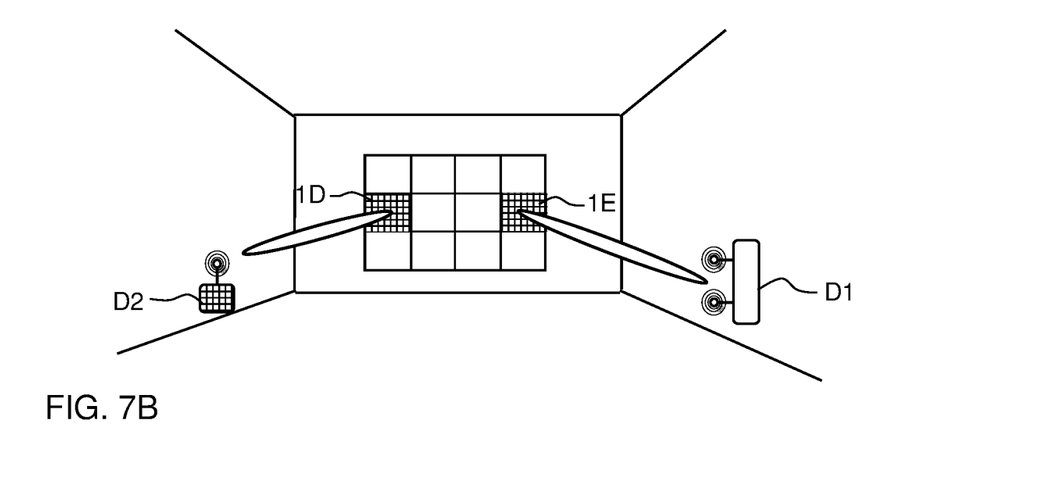

An example is shown in the side view of FIG. 7A, in which a master panel device 1 receives an RF signal and a slave panel device 1', which is spaced from master panel device 1 by another slave panel device 1', re-transmits the RF signal. Another example is shown in the perspective view of FIG. 7B, in which a panel device 1D receives an RF signal with beamforming from D2 and a panel device 1E re-transmits the RF signal with beamforming to D1. For example, it is conceivable that panel device 1D, which is closest to D2, has far stronger received signal than the other panel devices. However, panel device 1D may be far away from D1, so that the link between panel device 1D and D1 is weak. In such an example, it may be advantageous to receive the RF signal from D2 by panel device 1D and re-transmit the RF signal from panel device 1E, which is located closest to D1. In some embodiments, this functionality is achieved by setting panel device 1D in a static receiving state RX2 and panel device 1E in a static transmitting state TX1 (FIG. 3B). In state RX2, panel device 1D applies RX2 phase settings to phase align the analog antenna signals in its antenna units 2 and coherently combines the antenna signals into the above-mentioned aggregated antenna signal. Thereby, panel device 1D receives the RF signal with beamforming in relation to D2. Panel device 1D then transfers the aggregated antenna signal, as control data CD, to panel device 1E (via any intermediate panel devices, cf. FIGS. 7A-7B). It may be noted that the aggregated antenna signal, which is an analog signal, may be transferred in either analog or digital format. In state TX1, panel device 1E receives the aggregated antenna signal and diverts a portion of the received analog signal to each of the antenna units 2 in the panel device 1. The antenna units 2 apply TX1 phase settings to transmit the RF signal with beamforming in relation to D1.

In some embodiments, the RX2 and TX1 phase settings may be determined based on the phase settings for one or more other static states of the respective panel device. Reverting to the above non-limiting example of static states RR1 and RR2 being associated with phase settings θ1 and θ2, respectively, the phase settings for state TX1 and RX2 may be given by θ1/2 and θ2/2, respectively.

By analogy, a panel device may attain a static receiver state RX1 (FIG. 3B), which applies phase settings that cause the panel device to receive a RF signal with beamforming in relation to D1 and generate an aggregated antenna signal, and a static transmitter state TX2 (FIG. 3B), which applies phase settings that cause the panel device to transmit an RF signal with beamforming in relation to D2 based on an aggregated antenna signal. For example, the phase settings for state RX1 and TX2 may be given by θ1/2 and θ2/2, respectively.

The embodiments with spatially separate receipt and transmission of an RF signal are equally applicable to groups of panels devices. To ensure coherent operation within a group of receiving panel devices, a master panel device of the group may be set to state RX1 (or RX2) and the respective slave panel device of the group may be set to slave state RX1* (or RX2*). By analogy with slave states RR1*, RR2* and R12*, slave states RX1*, RX2* may apply the RX1, RX2 phase settings adjusted by phase correction data to the phase shifters 8 in the antenna units 2. Alternatively, the phase settings of the slave states RX1*, RX2* may be computed based on the phase settings of the slave states RR1*, RR2*. Similarly, slave panel devices within a group of transmitting panel devices may be set to slave state TX1* (or TX2*), which may apply the TX1 (or TX2) phase settings adjusted by phase correction data to the phase shifters 8 in the antenna units 2. Alternatively, the phase settings of the slave states TX1*, TX2* may be computed based on the phase settings of the slave states RR1*, RR2*.

Figure 8:
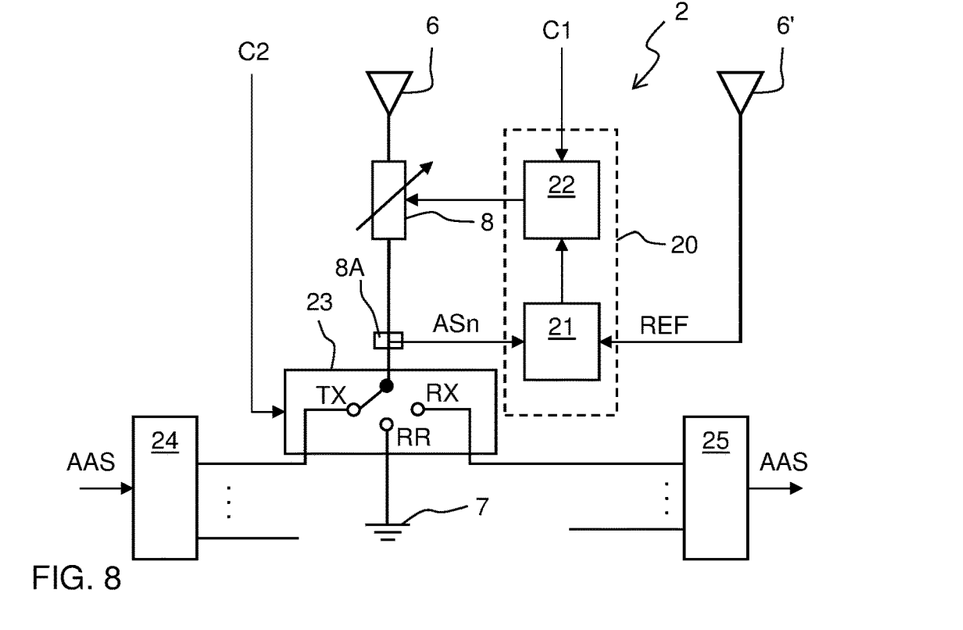
FIG. 8 is a circuit diagram of an antenna unit in accordance with an embodiment.

FIG. 8 illustrates an embodiment of an antenna unit 2 that enables spatially separate receipt and transmission of an RF signal. The following description will focus on differences over the embodiment in FIG. 2C. The antenna unit 2 comprises a switch 23, which is arranged intermediate the phase shifter 8 and the RF reflection element 7 and is configured to attain either of three switch states RR, TX, RX. The switch 23 may be set in a switch state based on a control signal C2 from the processor 4. Switch state RR electrically connects the antenna 6 to the RF reflection element 7 and causes the antenna unit 2 to reflect an incoming RF signal. Switch state TX electrically connects the antenna 6 to an input device 24 which is configured to receive and distribute an incoming aggregated antenna signal AAS to the antenna units 2 of the panel device. Switch state TX thereby causes the antenna unit 2 to direct an analog signal to the antenna 6 for transmission. Switch state RX electrically connects the antenna 6 to an output device 25 which is configured to receive and combine antenna signals from the antenna units 2 of the panel device. Switch state RX thereby causes the antenna unit 2 to receive an incoming RF signal, preferably without reflection.

Reverting to FIG. 3B, the panel device may also be configured to attain the static state OFF, in which the phase controller 22 may apply predefined phase settings that effectively randomize the phase among the antenna units 2 in the panel device. This will prevent the panel device from being inadvertently configured to reflect an incoming RF signal with beamforming, which might potentially disturb the operation of communication devices located within range. In an alternative embodiment, the static state OFF may involve setting the switch 23 to a switch state which is configured to disable the ability of the antenna unit 2 to reflect incoming RF signals.

Figure 9:
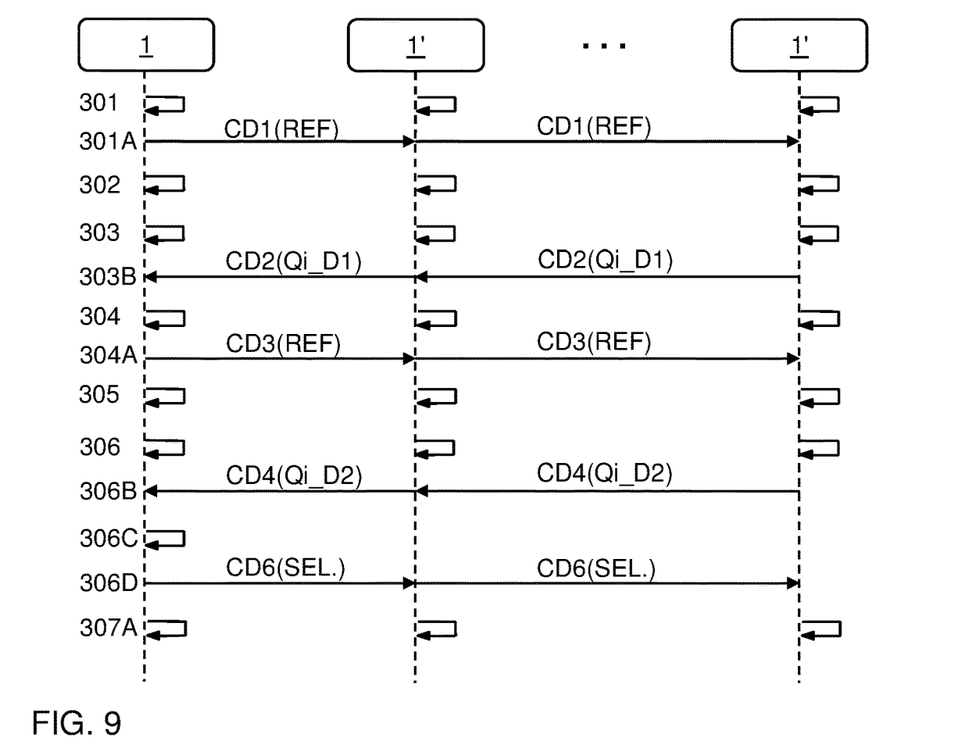
FIG. 9 is an example sequence diagram of a configuration process in a system of panel devices.

Some of the foregoing embodiments will be further exemplified with reference to FIG. 9, which illustrates signaling within a system of panel devices, comprising a master panel device 1 and slave panel devices 1'. The illustrated example is mapped to the steps in FIG. 3 and also includes some additional steps. Each panel device 1, 1' receives an RF signal from D1 (step 301), the master panel device 1 transfers the analog antenna reference signal REF to the slave panel devices 1' (step 301A), the master panel device 1 determines its phase settings for state RR1 (step 302), the respective slave panel device 1' determines its phase settings for state RR1* (step 302), and the panel devices 1, 1' store their phase settings (step 303). The respective slave device 1' determines a current value Qi_D1 of a signal quality parameter for D1 and transfers the current value to the master panel device 1 (step 303B), which stores the current values. Then, each panel device 1, 1' receives an RF signal from D2 (step 304), the master panel device 1 transfers the analog antenna reference signal REF to the slave panel devices 1' (step 304A), the master panel device 1 determines its phase settings for state RR2 (step 305), the respective slave panel device 1' determines its phase settings for state RR2* (step 305), and the panel devices 1, 1' store their phase settings (step 306). The respective slave device 1' determines a current value Qi_D2 of a signal quality parameter for D2 and transfers the current value to the master panel device 1 (step 306B), which evaluates the current values Qi_D1, Qi_D2 and determines a respective static state for the respective panel device 1, 1' (step 306C). The master panel device 1 communicates the selected state to the respective slave device 1' (step 306D), which thereby derives and applies the phase settings for its assigned static state (step 307A). The master panel device 1 also derives and applies the phase settings for its assigned static state (step 307A). For example, step 307A may result in the system being configured in correspondence with any one of FIGS. 6B, 6D, 6E and 7B.

The foregoing description presumes that the first and second adaptive states R1, R2 are attained in sequence by the system for determination of the phase settings in relation to both D1 and D2. However, it is conceivable that the second adaptive state R2 is omitted or performed well in advance of the first adaptive state R1, e.g. if D2 is known to be stationary in relation to the system. In an alternative, a predefined codebook of phase settings in relation to D2 may be stored by the respective panel device in the system.

Although the foregoing embodiments have been described for a system comprising an aggregation of physically separate panel devices, the embodiments are equally applicable to a system consisting of a single panel device. By analogy with FIG. 6D, a subset 1A of the antenna units in a panel device may be set to receive and reflect RF signals with beamforming between two communication devices. By analogy with FIG. 6E, different subsets 1B, 1C of the antenna units in a panel device may be set to receive and reflect RF signals with beamforming between different pairs of communication devices. By analogy with FIG. 7B, different subsets 1D, 1E of the antenna units in a panel device may be set to receive and reflect, respectively, RF signals with beamforming between two communication devices.

While the subject of the present disclosure has been described in connection with what is presently considered to be the most practical and preferred embodiments, it is to be understood that the subject is not to be limited to the disclosed embodiments, but on the contrary, is intended to cover various modifications and equivalent arrangements included within the spirit and the scope of the appended claims.

Further, while operations are depicted in the drawings in a particular order, this should not be understood as requiring that such operations be performed in the particular order shown or in sequential order, or that all illustrated operations be performed, to achieve desirable results. In certain circumstances, parallel processing may be advantageous.

In the following, items are recited to summarize some aspects and embodiments as disclosed in the foregoing.

Item 1. A system for reflecting an RF signal, comprising:
a plurality of antenna units (2) which are configured to receive and passively reflect the RF signal, wherein each of the antenna units (2) comprises a respective phase shifter (8) operable to adjustably impose a phase change on the RF signal before reflection;
a reference antenna (6'); and
a control system (1A, 20) in communication with the reference antenna (6') and the respective phase shifter (8), said control system (1A, 20) being configured to:
operate the respective phase shifter (8) to phase align a first analog antenna signal received by the respective antenna unit (2) in response to a first RF signal from a first device (D1), with a first analog reference signal (REF) received by the reference antenna (6') in response to the first RF signal;
determine, for the respective phase shifter (8), a first phase setting that corresponds to a phase of the respective phase shifter (8) when the first analog antenna signal is phase aligned with the first analog reference signal (REF); and
store the first phase setting.

Item 2. The system of item 1, wherein the control system (1A, 20) is further configured to: generate a product or sum of a first input signal corresponding to the first analog antenna signal and a reference input signal corresponding to the first analog reference signal (REF), and adjust a phase of the respective phase shifter (8) until the product or sum fulfils a predefined criterion, wherein the first phase setting corresponds to the phase of the respective phase shifter (8) when the product or sum fulfils the predefined criterion.

Item 3. The system of item 1 or 2, wherein the respective antenna unit (2) comprises an antenna (6), an RF reflection element (7) configured to reflect the first analog antenna signal, and an electrically conducting path extending from the antenna (6) to the RF reflection element (7).

Item 4. The system of item 3, wherein the respective phase shifter (8) is arranged in the electrically conducting path intermediate the antenna (6) and the RF reflection element (7).

Item 5. The system of item 4, wherein the respective antenna unit (2) further comprises a switch (23), which is arranged in the electrically conducting path intermediate the respective phase shifter (8) and the RF reflection element (7), wherein the switch (23) is operable, by the control system (1A, 20), to attain a first switch state (RR) in which the switch (23) electrically connects the phase shifter (8) to the RF reflection element (7) and further to attain at least one of a second and third switch state (TX, RX), wherein the switch (23) in the second switch state (TX) connects the phase shifter (8) to a first device (24) which is configured to supply an analog input signal, and wherein the switch (23) in the third switch state (RX) connects the phase shifter (8) to a second device (25), which is configured to combine analog signals into an aggregated signal.

Item 6. The system of any preceding item, wherein the first phase setting corresponds to a time delay imposed by the phase shifter (8) on the first analog antenna signal.

Item 7. The system of any preceding item, wherein said control system (1A, 20) is further configured to: operate the respective phase shifter (8) to phase align a second analog antenna signal received by the respective antenna unit (2) in response to a second RF signal from a second device (D2), with a second analog reference signal (REF) received by the reference antenna (6') in response to the second RF signal; determine, for the respective phase shifter (8), a second phase setting that corresponds to the phase of the respective phase shifter (8) when the second analog antenna signal (AS1, . . . , ASn) is phase aligned with the second analog reference signal (REF); and store the second phase setting or a combined phase setting corresponding to a combination of the first and second phase settings.

Item 8. The system of item 7, wherein said control system (1A, 20) is further configured to: apply the combined phase setting to the respective phase shifter (8) in a first group (1A, 1B, 1C) of antenna units (2) among the plurality of antenna units (2), thereby configuring said group (1A, 1B, 1C) of antenna units to reflect an incoming RF signal from the first device (D1) to the second device (D2), or from the second device (D2) to the first device (D1).

Item 9. The system of any one of items 1-7, wherein said control system (1A, 20) is further configured to: generate an aggregated antenna signal (AAS) by coherently combining third analog antenna signals received, in response to an incoming RF signal from the first device (D1), by the antenna units (2) in a first group (1D) of antenna units (2) among the plurality of antenna units (2), provide the aggregated antenna signal (AAS) to the antenna units (2) in a second group (1E) of antenna units (2) among the plurality of antenna units (2), and operate the antenna units (2) in the second group (1E) to transmit the incoming RF signal.

Item 10. The system of item 9, wherein the first and second groups (1D, 1E) are non-overlapping.

Item 11. The system of item 9 or 10, wherein said control system (1A, 20) is configured to: compute a third phase setting of the respective phase shifter (8) in the first group (1D) of antenna units (2) as a function of the first phase setting, apply the third phase setting to the respective phase shifter (8) in the first subset (1D) to phase align the third analog signals, and combine the phase-aligned third analog signals to generate the aggregated antenna signal (AAS).

Item 12. The system of any one of items 8-11, wherein the control system (1A, 20) is configured to determine signal quality data at the plurality of antenna units (2), and define at least one of the first and second groups (1A-1E) as a function of the signal quality data.

Item 13. The system of any one of items 8-12, wherein the first and second groups of antenna units (2) are arranged on separate panel devices (1, 1').

Item 14. The system of any preceding item, comprising panel devices (1, 1') comprising a respective subset of the plurality of antenna units (2), wherein the control system (1A, 20) is configured to coordinate operation of the panel devices (1, 1').

Item 15. A panel device comprising a housing, and a system according to any one of items 1-12, wherein the housing comprises a support (3) for the plurality of antenna units (2) and the reference antenna (6').

Item 16. The panel device of item 15, which comprises a signal interface (30A) for connection to a further panel device (1') comprising a system according to any one of items 1-12, wherein the control system (1A, 20) of the panel device is configured to exchange control data (CD) with the further panel device (1') over the signal interface (30A).

Item 17. The panel device of item 16, wherein the control system (1A, 20) is configured to transmit the control data (CD) to set an operation state of the further panel device (1'), said operation state causing the further panel device (1') to apply a dedicated phase setting to the respective phase shifter (8) among the plurality of antenna units (2) in the further panel device (1').

Item 18. The panel device of item 16 or 17, wherein the control data (CD) comprises reference phase data (REF) and causes the further panel device (1') to phase align, based on the reference phase data (REF), the first analog antenna signals in the antenna units (2) of the further panel device (1') with the first analog antenna signals in the antenna units (2) of the panel device.

Item 19. The panel device of any one of items 16-18, further comprising a power interface (30B) for supplying electric power to and/or receiving electric power from the further panel device (1').

Item 20. A method in a system for reflecting an RF signal, said system comprising a plurality of antenna units (2) which are configured to receive and passively reflect the RF signal, wherein each of the antenna units (2) comprises a respective phase shifter (8) operable to adjustably impose a phase change on the RF signal before reflection, and a reference antenna (6'), said method comprising:

operating (301) the respective phase shifter (8) to phase align a first analog antenna signal received by the respective antenna unit (2) in response to a first RF signal from a first device (D1), with a first analog reference signal (REF) received by the reference antenna (6') in response to the first RF signal;

determining (302), for the respective phase shifter (8), a first phase setting that corresponds to a phase of the respective phase shifter (8) when the first analog antenna signal is phase aligned with the first analog reference signal (REF); and storing (303) the first phase setting.

Item 21. The method of item 20, wherein said determining (302) comprises: generating a product or sum of a first input signal corresponding to the first analog antenna signal and a reference input signal corresponding to the first analog reference signal (REF), and adjusting a phase of the respective phase shifter (8) until the product or sum fulfils a predefined criterion, wherein the first phase setting corresponds to the phase of the respective phase shifter (8) when the product or sum fulfils the predefined criterion.

Item 22. The method of item 20 or 21, further comprising: operating (304) the respective phase shifter (8) to phase align a second analog antenna signal received by the respective antenna unit (2) in response to a second RF signal from a second device (D2), with a second analog reference signal (REF) received by the reference antenna (6') in response to the second RF signal; determining (305), for the respective phase shifter (8), a second phase setting that corresponds to a phase of the respective phase shifter (8) when the second analog antenna signal is phase aligned with the second analog reference signal (REF); and storing (306) the second phase setting or a combined phase setting corresponding to a combination of the first and second phase settings.

Item 23. The method of item 22, further comprising: applying (307) the combined phase setting to the respective phase shifter (8) in a first group (1A, 1B, 1C) of antenna units (2) among the plurality of antenna units (2), thereby configuring said group (1A, 1B, 1C) of antenna units to reflect an incoming RF signal from the first device (D1) to the second device (D2), or from the second device (D2) to the first device (D1).

Item 24. A computer-readable medium comprising computer instructions which, when executed by a processor (4), cause the processor (4) to perform the method of any one of items 20-23.

The invention claimed is:

1. A system for reflecting an RF signal, comprising:
a plurality of antenna units which are configured to receive and passively reflect the RF signal, wherein each of the antenna units comprises a respective phase shifter operable to adjustably impose a phase change on the RF signal before reflection,
a reference antenna, and
a control system in communication with the reference antenna and the respective phase shifter, said control system being configured to:
operate the respective phase shifter to phase align a first analog antenna signal received by the respective antenna unit in response to a first RF signal from a first device, with a first analog reference signal received by the reference antenna in response to the first RF signal,
determine, for the respective phase shifter, a first phase setting that corresponds to a phase of the respective phase shifter when the first analog antenna signal is phase aligned with the first analog reference signal, and store the first phase setting.

2. The system of claim 1, wherein the control system is further configured to: generate a product or sum of a first input signal corresponding to the first analog antenna signal and a reference input signal corresponding to the first analog reference signal, and adjust a phase of the respective phase shifter until the product or sum fulfils a predefined criterion, wherein the first phase setting corresponds to the phase of the respective phase shifter when the product or sum fulfils the predefined criterion.

3. The system of claim 1, wherein the respective antenna unit comprises an antenna, an RF reflection element configured to reflect the first analog antenna signal, and an electrically conducting path extending from the antenna to the RF reflection element.

4. The system of claim 3, wherein the respective phase shifter is arranged in the electrically conducting path intermediate the antenna and the RF reflection element.

5. The system of claim 4, wherein the respective antenna unit further comprises a switch, which is arranged in the electrically conducting path intermediate the respective phase shifter and the RF reflection element, wherein the switch is operable, by the control system, to attain a first switch state in which the switch electrically connects the phase shifter to the RF reflection element and further to attain at least one of a second and third switch state, wherein the switch in the second switch state connects the phase shifter to a first device which is configured to supply an analog input signal, and wherein the switch in the third switch state connects the phase shifter to a second device, which is configured to combine analog signals into an aggregated signal.

6. The system of claim 1, any preceding claim 1, wherein said control system is further configured to:
operate the respective phase shifter to phase align a second analog antenna signal received by the respective antenna unit in response to a second RF signal from a second device, with a second analog reference signal received by the reference antenna in response to the second RF signal,
determine, for the respective phase shifter, a second phase setting that corresponds to the phase of the respective phase shifter when the second analog antenna signal is phase aligned with a first analog reference signal, and
store the second phase setting or a combined phase setting corresponding to a combination of the first and second phase settings.

7. The system of claim 6, wherein said control system is further configured to: apply the combined phase setting to the respective phase shifter in a first group of antenna units among the plurality of antenna units, thereby configuring said group of antenna units to reflect an incoming RF signal from the first device to the second device, or from the second device to the first device.

8. The system of claim 1, wherein said control system is further configured to: generate an aggregated antenna signal by coherently combining third analog antenna signals received, in response to an incoming RF signal from the first device, by the antenna units in a first group of antenna units among the plurality of antenna units, provide the aggregated antenna signal to the antenna units in a second group of antenna units among the plurality of antenna units, and operate the antenna units in the second group to transmit the incoming RF signal.

9. The system of claim 8, wherein the first and second groups are non-overlapping.

10. The system of claim 8, wherein said control system is configured to: compute a third phase setting of the respective phase shifter in the first group of antenna units as a function of the first phase setting, apply the third phase setting to the respective phase shifter in the first subset to phase align the third analog signals, and combine the phase-aligned third analog signals to generate the aggregated antenna signal.

11. The system of claim 8, wherein the control system is configured to determine signal quality data at the plurality of antenna units, and define at least one of the first and second groups as a function of the signal quality data.

12. The system of claim 8, wherein the first and second groups of antenna units are arranged on separate panel devices.

13. The system of claim 1, comprising panel devices comprising a respective subset of the plurality of antenna units, wherein the control system is configured to coordinate operation of the panel devices.

14. A panel device comprising a housing and a system according to claim 1, wherein the housing comprises a support for the plurality of antenna units and the reference antenna.

15. The panel device of claim 14, which comprises a signal interface for connection to a further panel device, wherein the control system of the panel device is configured to exchange control data with the further panel device over the signal interface.

16. The panel device of claim 15, wherein the control system is configured to transmit the control data to set an operation state of the further panel device, said operation state causing the further panel device to apply a dedicated phase setting to the respective phase shifter among the plurality of antenna units in the further panel device.

17. The panel device of claim 15, wherein the control data comprises reference phase data and causes the further panel device to phase align, based on the reference phase data, the first analog antenna signals in the antenna units of the further panel device with the first analog antenna signals in the antenna units of the panel device.

18. The panel device of claim 15, further comprising a power interface for supplying electric power to and/or receiving electric power from the further panel device.

19. A method in a system for reflecting an RF signal, said system comprising a plurality of antenna units which are configured to receive and passively reflect the RF signal, wherein each of the antenna units comprises a respective phase shifter operable to adjustably impose a phase change on the RF signal before reflection, and a reference antenna, said method comprising:
operating the respective phase shifter to phase align a first analog antenna signal received by the respective antenna unit in response to a first RF signal from a first device, with a first analog reference signal received by the reference antenna in response to the first RF signal;
determining, for the respective phase shifter, a first phase setting that corresponds to a phase of the respective phase shifter when the first analog antenna signal is phase aligned with the first analog reference signal; and
storing the first phase setting.

20. A non-transitory computer-readable medium comprising computer instructions which, when executed by a processor, cause the processor to perform the method of claim 19.

* * * * *